US008458321B2

(12) United States Patent
Agulnik et al.

(10) Patent No.: US 8,458,321 B2
(45) Date of Patent: Jun. 4, 2013

(54) METHOD AND SYSTEM OF UPDATING PRESENCE INFORMATION IN A COMMUNICATION SYSTEM

(75) Inventors: Anatoly Agulnik, Deerfield, IL (US); Donald G. Newberg, Hoffman Estates, IL (US); John M. Harris, Chicago, IL (US); Sean S. Kelley, Barrington, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 202 days.

(21) Appl. No.: 12/492,478

(22) Filed: Jun. 26, 2009

(65) Prior Publication Data
US 2010/0332647 A1    Dec. 30, 2010

(51) Int. Cl.
*G06F 15/173* (2006.01)

(52) U.S. Cl.
USPC .......................................... 709/224; 455/518

(58) Field of Classification Search
USPC ................. 709/201, 206, 224, 203, 204, 205, 709/222; 370/431, 315, 328, 351; 705/1; 707/200, 10, 100; 455/519, 422.1; 710/15; 726/3; 345/473; 340/994
See application file for complete search history.

(56) References Cited

U.S. PATENT DOCUMENTS

| | | | |
|---|---|---|---|
| 7,064,681 B2 * | 6/2006 | Horstemeyer | 340/994 |
| 7,454,781 B2 * | 11/2008 | Tachizawa et al. | 726/3 |
| 7,844,667 B2 * | 11/2010 | Ito et al. | 709/206 |
| 7,899,479 B2 * | 3/2011 | Zhang | 455/519 |
| 7,961,667 B2 * | 6/2011 | Perzy et al. | 370/328 |
| 2003/0028597 A1 * | 2/2003 | Salmi et al. | 709/204 |
| 2004/0003037 A1 * | 1/2004 | Fujimoto et al. | 709/203 |
| 2005/0144333 A1 * | 6/2005 | Kotzin | 710/15 |
| 2005/0210104 A1 * | 9/2005 | Torvinen | 709/205 |
| 2005/0262198 A1 * | 11/2005 | Leppanen et al. | 709/204 |
| 2006/0248184 A1 * | 11/2006 | Wu et al. | 709/224 |
| 2007/0124158 A1 * | 5/2007 | Kakuta et al. | 705/1 |
| 2007/0150491 A1 * | 6/2007 | Torvinen | 707/100 |
| 2007/0165554 A1 * | 7/2007 | Jefferson et al. | 370/315 |
| 2007/0206500 A1 | 9/2007 | Mollah | |
| 2008/0027996 A1 * | 1/2008 | Morris | 707/200 |
| 2008/0114776 A1 * | 5/2008 | Sun et al. | 707/10 |
| 2008/0183816 A1 * | 7/2008 | Morris | 709/204 |
| 2008/0208953 A1 * | 8/2008 | Tian | 709/201 |
| 2008/0285542 A1 * | 11/2008 | Jachner | 370/351 |

(Continued)

FOREIGN PATENT DOCUMENTS

| | | | |
|---|---|---|---|
| EP | 1786172 A2 | 5/2007 | |
| EP | 1793561 A1 | 6/2007 | |

OTHER PUBLICATIONS

Open Mobile Alliance "Presence Simple Specification" Draft Version 1.1.1; Feb. 3, 2009.
PCT International Search Report Dated Nov. 17, 2010.

(Continued)

*Primary Examiner* — Dustin Nguyen
(74) *Attorney, Agent, or Firm* — Valerie M. Davis; Kenneth A. Haas

(57) ABSTRACT

In implementing a method of updating presence information for a plurality of presentities in a communication system, a presence server: defines a group of presentities that share the same value for a first presence attribute; receives an update of the value of the first presence attribute for one of the presentities in the group; and applies the update of the value to all of the presentities in the group.

11 Claims, 5 Drawing Sheets

U.S. PATENT DOCUMENTS

| | | | | |
|---|---|---|---|---|
| 2010/0098105 A1* | 4/2010 | Hung et al. | | 370/431 |
| 2010/0235426 A1* | 9/2010 | Chang | | 709/203 |
| 2010/0238179 A1* | 9/2010 | Kelly | | 345/473 |
| 2010/0274844 A1* | 10/2010 | Lindgren et al. | | 709/203 |
| 2010/0311409 A1* | 12/2010 | Dostal et al. | | 455/422.1 |
| 2011/0078271 A1* | 3/2011 | Ito et al. | | 709/206 |
| 2011/0219117 A1* | 9/2011 | Linder et al. | | 709/224 |
| 2012/0331117 A1* | 12/2012 | Nguyen et al. | | 709/222 |

OTHER PUBLICATIONS

"Relay Strategy of Broadcast Messages in Mobile Multihop Relay", David T. Chen, et al. Motorola Japan; IEEE 802.16 Presentation Submission Template (Rev. 8.3); IEEE C802.16MMR-06/08; Jun. 1, 2006; 14 Pages.

"Configuration Scenario for Multi-Hop Relay Network" Changhoi Koo, et al. Samsung Telecommunications America; IEEE 802.16 Presentation Submission Template (Rev. 8.3); IEEE 802.16 Session #41, New Delhi, India; Sep. 1, 2009; 25 Pages.

International Preliminary Report on Patentability and Written Opinion for counterpart International Patent Application No. PCT/US2010/039810 issued on Jan. 4, 2012.

\* cited by examiner ved herein

METHOD AND SYSTEM OF UPDATING PRESENCE INFORMATION IN A COMMUNICATION SYSTEM

TECHNICAL FIELD

The technical field generally relates to communication systems and, in particular, it relates to a method and system of updating presence information for a plurality of presentities in a communication system.

BACKGROUND

With the advent of computer networking today, it is quite easy for several communication devices to communicate via a wired or a wireless network or system. These communication devices communicate with each other using various wired or wireless protocols to exchange data or other media over one or more communication channels in the network. The communication channels typically have a fixed bandwidth and, therefore, can only support a limited amount of media. In some applications such as social networking (e.g., Instant Messaging applications), public safety, or applications for accomplishing a specific task, the communication devices may report (referred to in the art as "publishing" and also referred to herein as "updating"), to a central network entity (referred to in the art as a presence server), status or presence information of presentities or users of the communication devices. The central network entity "notifies" other users in the system (referred to in the art as "watchers") who have subscribed to the central network entity to receive this presence information. The presence information can include information such as location of the communication device, current operation being performed by the device, availability of a user of the device, and the like.

In the network, each of the communication devices consumes a part of channel bandwidth and other network resources to transmit the presence information to the central network entity. Thus, frequent updates of the presence information from a large number of devices may congest the network and lead to non-optimal use of the network resources. Moreover, as presence grows in importance, there is a danger that it could use a disproportionate share of network resources, especially in situations where the capacity of a network is limited, for example, for narrowband systems, at the edge of network coverage for broadband technologies, or at cell sites that support a large numbers of users.

Thus, there exists a need for a method and system for updating presence information for a plurality of presentities that minimizes the use of network resources.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
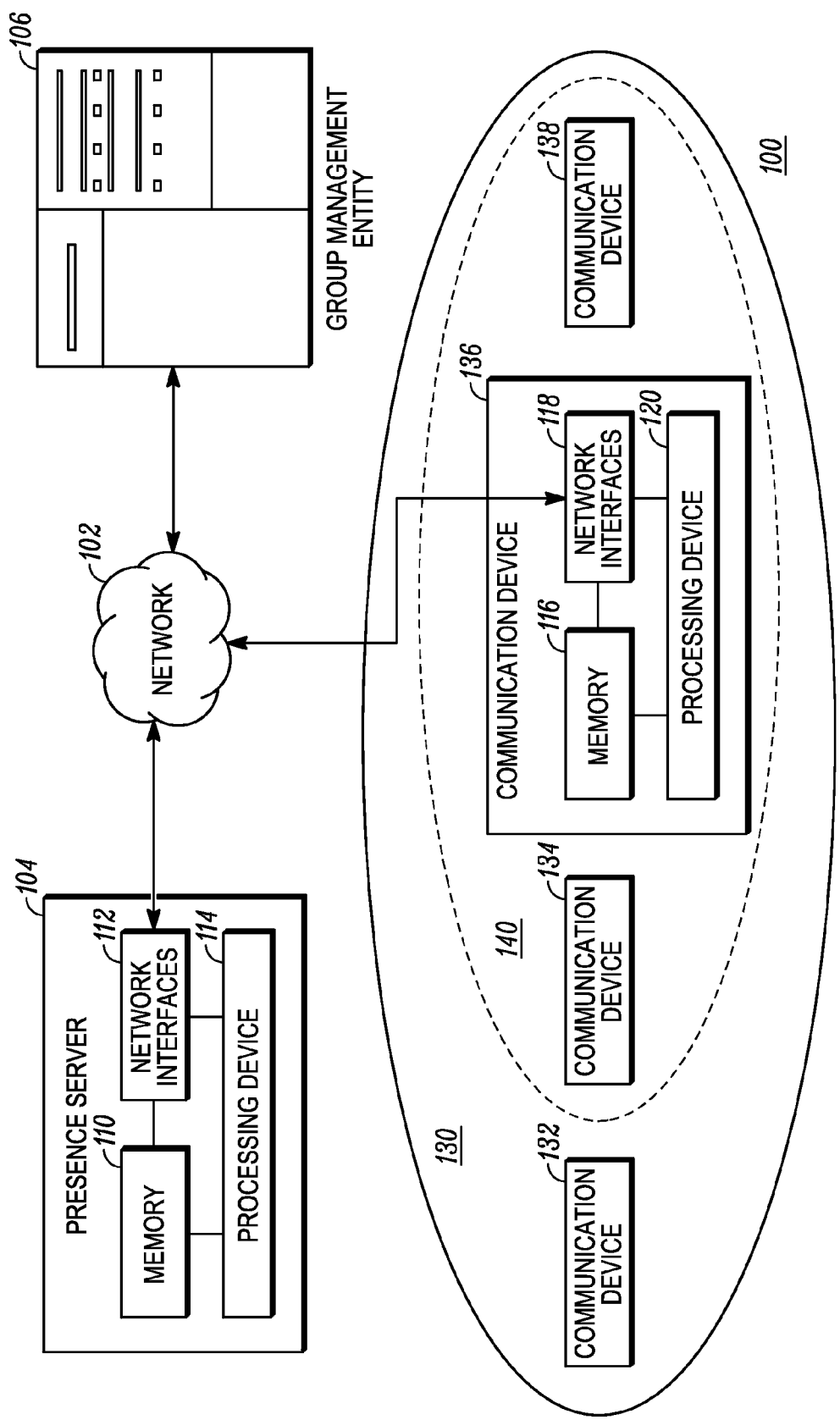
FIG. 1 is a block diagram illustrating a system wherein methods are implemented for updating presence information of a plurality of presentities in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required. Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to various embodiments, a method for updating presence information of a plurality of presentities in a communication system is provided. In an embodiment, a presence server defines a group of presentities that share the same value for a particular presence attribute. In an illustrative example, the presence server receives identification information of the presentities in the group from a group management entity, and the presence server uses this identification information to define the group. In another illustrative example, the presence server receives, from a communication device that reports presence information for a first presentity, an instruction to apply to the first presentity a value of the presence attribute for a second presentity; and the presence server defines the group to include the first and second presentities.

The presence server then receives an update of the value for the presence attribute for one of the presentities in the group and applies the update of the value to all of the presentities in the group. Such reporting minimizes the use of network resources and can decrease network congestion by changing an aggregate reporting rate of all of the presentities in the group. Those skilled in the art will realize that the above recognized advantages and other advantages described herein are merely illustrative and are not meant to be a complete rendering of all of the advantages of the various embodiments.

Referring now to the figures, FIG. 1 illustrates a communication system 100. Communication system 100 includes a network 102, a presence server 104, a group management entity 106, and a plurality of communication devices 132 to 138, wherein devices 132 to 138 form a communication group 130, such as a talkgroup, for exchanging media. Network 102 can be a wired network, a wireless network, or a network enabling both wired and wireless communications. Network 102 includes a numbers of infrastructure devices (not shown) for facilitating communications between the presence server 104, the group management entity 106, and the communication devices 132 to 138. Such infrastructure devices may include, but are not limited to, bridges, switches, zone controllers, base station controllers, repeaters, base radios, base stations, base transceiver stations, access points, routers or any other type of infrastructure equipment interfacing a communication device or a group management entity in a wireless or wired environment.

The communication devices 132 to 138 can be any standard communication device such as radios, mobile stations, subscriber units, mobile phones, Personal Digital Assistants (PDAs), laptops, two-way radios, cell phones, and the like. As illustrated by reference to the communication device 136, the devices 132 to 138 include a memory 116, one or more network interfaces 118, and a processing device 120 operatively coupled, for instance, as shown in FIG. 1. The network interfaces 118 can be used for, one or more of: communicating with the group management entity as described in more detail below; transmitting presence information for a presentity to the presence server 104 in accordance with the teachings herein; receiving communications from the presence server 104 to enable the implementations of methods in accordance with embodiments of the present disclosure; and receiving notifications of presence information of other presentities in the system.

The implementation of network interfaces 118 depends on the particular type of network 102, i.e., wired and/or wireless, to which the communication devices are connected. For example, where network 102 supports wired communications, network interfaces 118 may comprise a serial port interface (e.g., compliant to the RS-232 standard), a parallel port interface, an Ethernet interface, a USB interface, and/or a FireWire interface, and the like. Where the network 102 supports wireless communications, network interfaces 118 comprise elements including processing, modulating, and transceiver elements that are operable in accordance with any one or more standard or proprietary wireless interfaces, wherein some of the functionality of the processing, modulating, and transceiver elements may be performed in processing device 120 through programmed logic such as software applications.

Besides the above-mentioned functionality, implemented via programmed logic, processing device 120 is further programmed with logic for implementing methods (such as method 400 described below by reference to FIGS. 3, 4, and 6) for reporting presence information in accordance with the teachings herein. Memory 116 can include short-term and long-term storage of various data, e.g., presence information, configuration information, location information, etc., needed for the functioning of the communication device. Memory 116 may further comprise software for programming the processing device with the logic needed to perform its functionality.

As mentioned above, each communication device 132 to 138 reports presence information for at least one presentity, wherein a presentity is generally defined as a logical entity (that represents a device or person) described by presence information. For example, the users carrying and using the communication devices 132 to 138 are referred to as presentities. Moreover, presence information is defined as a dynamic set of information pertaining to a presentity that includes one or more presence attributes, wherein the presence information indicates status, reachability, willingness, and/or capabilities of a presentity to communicate. Presence information includes such status information as, for instance, user availability, location, network availability, user mood, moving direction, speed, destination, estimated time to reach a destination, distance from a destination, incident phase, completed percentage, stage, or phase of an assigned task during an incident, etc.

In addition, a presence attribute is defined herein as a particular type of presence information being conveyed for the presentity; and the state of the presentity for a given presence attribute is provided for by a value associated with the presence attribute. The presence attribute and the value may each be represented by a certain arrangement of symbols such as alphanumeric symbols, a binary number having a certain number of bits, etc. For instance, if the presence attribute is "availability" (as represented by a certain set or sequence of symbols), the value of or for this presence attribute is a set or sequence of symbols that indicate a state of the presentity of, for instance, "free for chat", "busy", "away", "do not disturb", "out to lunch", etc.

An example implementation of presence reporting will assist in the understanding of the concept of presence attributes and the values associated therewith. Open Mobile Alliance (OMA) publishes a Presence SIMPLE Specification (current draft dated Feb. 3, 2009) that defines an application level specification for SIP/SIMPLE-based presence service and makes use of the SIP (Session Initiation Protocol) protocol. The Presence SIMPLE Specification (also referred to herein as SIP/SIMPLE) can be implemented in communication systems such as system 100. In accordance with SIP/SIMPLE, presence information is reported by an entity called a Presence Source in a message called a SIP PUBLISH. The SIP PUBLISH includes an identification of the type of information being published and an identifier of the presentity that is described by the presence information. In accordance with one implementation of the teachings herein, a presence attribute and associated value could be inserted into a SIP PUBLISH to provide updates to the value for a common presence attribute.

Turning now to presence server 104, this device receives and stores (and may in turn distribute to watchers) the presence information of the presentities carrying the communication devices 132-138, in according with the disclosure herein. Presence server 104 includes a memory 110, one or more network interfaces 112, and a processing device 114 operatively coupled, for instance, as shown in FIG. 1. The network interfaces 112 can used for, one or more of: communicating with the group management entity as described in more detail below; receiving presence information from a communication device for a presentity and, if there are watchers, sending notification of the presence information or updates to the presence information; and sending communications to the communication devices to enable the implementations of methods in accordance with embodiments of the present disclosure.

The implementation of network interfaces 112 depends on the particular type of network 102, i.e., wired and/or wireless, to which the presence server is connected. For example, where network 102 supports wired communications, network interfaces 112 may comprise a serial port interface (e.g., compliant to the RS-232 standard), a parallel port interface, an Ethernet interface, a USB interface, and/or a FireWire interface, and the like. Where the network 102 supports wireless communications, network interfaces 112 comprise elements including processing, modulating, and transceiver elements that are operable in accordance with any one or more standard or proprietary wireless interfaces, wherein some of the functionality of the processing, modulating, and transceiver elements may be performed in processing device 114 through programmed logic.

Figure 2:
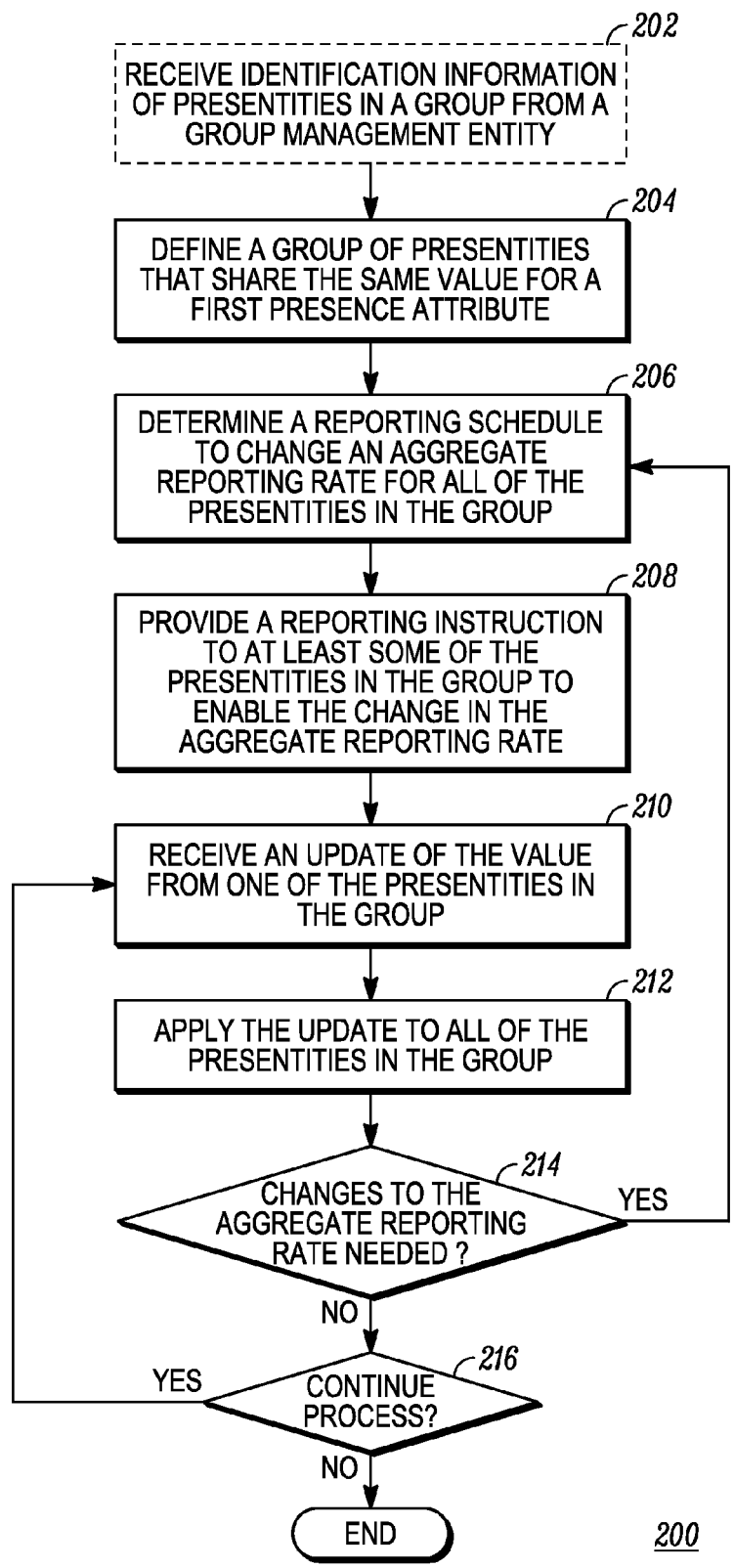
FIG. 2 is a flow diagram of a method, performed by a presence server, for updating presence information of a plurality of presentities in accordance with some embodiments.

Besides the above-mentioned functionality, implemented via programmed logic, processing device 114 is further programmed with logic for implementing methods (such as method 200 described below by reference to FIG. 2) for managing the reporting of presence information in accordance with the teachings herein. Memory 110 can include short-term and long-term storage of various data, e.g., presence information, identification information, location information, etc., corresponding to the communication devices 132 to 138 and the presentities. Memory 110 may further comprise software for programming the processing device with the logic needed to perform its functionality.

Group management entity 106 facilitates group communications between communication devices in the system 100. More particularly, in accordance with standard or proprietary protocols such as SIP, OMA PoC (Push to Talk over Cellular), etc., the communication devices exchange message signaling to establish sessions for media exchange between the members of the group. In one illustrative example, the communication devices 132 to 138 each exchange SIP signaling (e.g., a sequence of SIP INVITE, OK, ACK transactions) with the group management entity 106 to establish a session for a communication group (e.g., a talkgroup when the media being exchanged is voice) 130 that includes devices 132 to 138 as its members. The group management entity may also communicate with the presence server 104 to identify one or more groups of presentities that have the same value for a particular presence attribute. It should be noted that although the presence server 104 and group management entity 106 are illustrated in FIG. 1 as separate physical devices, in another embodiment the functions of server 104 and entity 106 may be combined into one physical device.

Communication devices 132 to 138 (or a subset thereof) and presence server 104 communicate via network 102 to implement methods in accordance with the teachings herein for updating presence information of presentities. In accordance with one embodiment, the presence server 104 implements a method 200 illustrated by reference to FIG. 2. For instance, processing device 114 is programmed with logic for performing at least some of the functional steps of method 200 as hereinafter described; thereby being implemented as a special purpose processor or special purpose computer programmed to perform method 200. In other words, this special purpose computer is the structure that serves as the means for performing the functionality of method 200.

In order to manage the updating of presence information received from one or more of communication devise 132 to 138, in accordance with method 200, the presence server first determines or defines (204) a group of presentities that share the same value for a first (common) presence attribute. The presence server may define such groups alone or with information from one or more communication devices or one or more other infrastructure devices such as the group management entity 106, GPS (Global Positioning System) equipment that determines location information for the communication devices, CAD (computer aided dispatch) equipment and personnel, etc.

In one illustrative example, upon forming the communication group 130 (for instance a talkgroup) comprising communication devices 132 to 138, the group management entity 106 determines that all or some of these communication devices will likely report duplicative presence information, i.e., share the same value for a common presence attribute. The parameters that may be analyzed to make this determination may include, but is not limited to: the communication devices being members of the same communication group; users of the communications devices or the devices themselves being within a particular geographic area, precinct, location, etc.; users being assigned to the same incident (such as a group of firemen, policemen, and emergency medical personnel dispatched to a fire incident); users being assigned the same functional role (e.g., in a writhing agency, patrol officers for a particular precinct; for an incident, traffic control officers for a mutual aid interagency incident; a common work group such as a SWAT represents team); users possessing a defined set of skills (e.g., the set of users are trauma specialists, bomb experts, host negotiators, etc.); etc.

For example, group management entity 106 determines (e.g., via communication with a CAD system) that the users of communication devices 134, 136, and 138 are Swat team members assigned to the same incident and that they are traveling in the same vehicle. The group management entity determines that the presence attribute for which status information needs to be reported is whether the Swat team members have arrived on the scene. The group management entity groups devices 134, 136, and 138 (e.g., a subset 140) and their associated users and generates a common presence report list having identification information (e.g., identifiers) of the presentities in the group (and optionally the common presence attribute) and sends this identification information to the presence server 104, along with an indication or instruction that the group shares the same value for the particular attribute. Where the SIP/SIMPLE standard is implemented, the identification information may comprise a unique SIP URI (Uniform Resource Indicator) for each presentity in the group. The group management entity may also send other information to the presence server to facilitate the server's functions, in accordance with the teachings herein, such as identifications for devices 134, 136, 138 and the capabilities of these devices and the bindings between the presentities and their respective devices 134, 136, 138.

Upon receiving (202) the identification information for the presentities associated with group, an update of the value of the common presence attribute that the presence server receives (210) for any one of the presentities in the group is applied (212) to all of the presentities in the group. An "update" in general means both the initial and any follow-up reporting or publication of the presence attribute and associated value. Also, an update to the value can be that the value remains the same or changes. Moreover, the presence server "applies" the updated value by, at least, storing the same value for all of the presentities in the group.

In a SIP/SIMPLE embodiment, a logical entity (as implemented for instance using a special purpose processor) that resides in a communication device and is referred to in the art as a presence source provides presence information to the presence server. The presence source can report presence information for the communication device in which it resides or the user of the communication device or can provide presence information for some second device or user (which is known as publishing on behalf of another presentity); in this case, the presence information is for the second device or user and the publishing on behalf of the second device or user may be due, for example, to capability limitations of the second device.

Associated with the reporting of the updated value for the common presence attribute, is an aggregate reporting rate for the group of presentities. The aggregate reporting rate for a group is defined as the total number of presence updates sent by all of the presence sources associated with the group over a given amount of time. An aspect of the present disclosure is that the presence server may set (either initially before an initial presence reporting is received or via subsequent changes) the aggregate reporting rate for the group.

For example, the presence server may receive information regarding current network conditions such as congestion, bandwidth utilization, etc. and may determine (214) to set the aggregate reporting rate for the group (and usually for other groups of presentities as well) to more efficiently utilize network resources or to decrease congestion in the network. In this case, the presence server determines (206) a reporting schedule to set the aggregate reporting rate for the group, wherein the reporting schedule determines which communication devices report the value of the common presence attribute. In another implementation, the presence server may in addition or in the alternative determine how often the reporting devices publish the updated value. The presence server then provides (208) an instruction to each relevant communication device on whether (and/or how) to report the updated value, so as to maintain the aggregate reporting rate. In another embodiment, the group management entity or another infrastructure device performs the functionality of blocks 206, 208, and 214 and provides the relevant instructions to the presence server and/or communication devices.

There are a number of ways in which the presence server can modify how the value of the common presence attribute is reported for the presentities in the group. The adjustment depends, for example, on the capability and current state (e.g., battery life) of the communication devices that can report the presence information, what attributes are common, the way those attributes are normally or currently being reported, etc. Three implementations are described below for illustrative purposes and are not meant to limit the scope of such implementations. The example implementations can be used alone or in some combination.

For example, in one implementation, the reporting schedule comprises a first subset (one or more) of the group of communication devices reporting the updates of the value of the common presence attribute and a second subset (one or more) of the communication devices discontinuing the reporting of the value, wherein the presence server provides (208) an instruction to those communication devices that should discontinue their reporting.

The presence server may over time and based on various factors such as device capabilities, changing of assigned roles, communication devices being added or removed from use, remaining battery life or conservation of battery life of the communication devices, etc., change the communication devices within the first and second subsets. Turning back to the Swat team example, the presence server or more likely the group management entity may determine that only a selected one member (e.g., a "lead" member) of the group will send the updates and all of the other members will discontinue reporting. The presence server may or may not change the designated reporting member over time. This implementation may dramatically reduce the presence information traffic, for example, for event driven reports when the same event is experience by a large number of users.

In another implementation, the presence server instructs all of the communications devices or a subset of the communication devices to report only one value update out of several value updates. For example, for a report triggered by events (access to network cell, or car movement such as start, stop, traffic light stop, turn toward south, turn toward west, etc.) a device will publish every fifth event instead of every single event. Each device report can further have a different starting point for reporting to minimize overlap in the reporting. Similarly for a time-based reporting (current temperature or light level every minute), the reporting devices may skip four reports and publish the fifth report or one random report out of five possible reports.

In yet another implementation, the presence server instructs all of the communication devices or a subset of the communication devices to decrease their update time rate. This change in update period may, for example, be proportional to the number of users so that the total publish traffic will be the same for small and large groups of users. In addition, the distribution of the reporting time can be adjusted for each reporting device so that, overall, the updates are approximately periodic.

All of the above implementations and the above description are directed to a single common presence attribute for a group of presentities. However, a given group may have multiple presence attributes in common. In such a case of multiple common presence attributes, the reporting for all of the presence attributes can be based on a single reporting schedule or multiple reporting schedules (e.g., one for each common presence attribute). Moreover, where multiple reporting schedules are used, they may be the same or different.

For example, communication device 1 (for a user 1) reports two common presence attributes, and communication device 2 (for a user 2) reports a third common presence attribute (maybe more or less often). All communication devices report a fourth common presence attribute but at a slower rate. In this example implementation, user 1 is an incident commander, which is why he (via his device) was selected to report the first two common presence attributes related to an incident. User 2 has the most accurate GPS; therefore, he (via his device) reports the current location, direction, and speed (the third common presence attribute). And the fourth common presence attribute (signal strength/quality for instance) is related to all members of the communication group and is reported randomly but very seldom by everyone (via all communication devices); however the presence server will still receives the reports very often and can apply an average value to all users. The reporting process continues (216) until no further updates of the value for the common presence attribute are needed or desired, whereupon the process ends.

In another embodiment, the presence server defines the group of presentities that share the same value for one or more common presence attributes based on input or instructions from one or more of the communication devices in the system. For example, a communication device, that reports presence information for a first presentity, provides an instruction to the presence server to apply to first presentity a value of a common presence attribute for a second presentity, wherein the group of presentities is defined to include at least the first and second presentities. FIGS. 3 through 6 further illustrate this embodiment.

Figure 3:
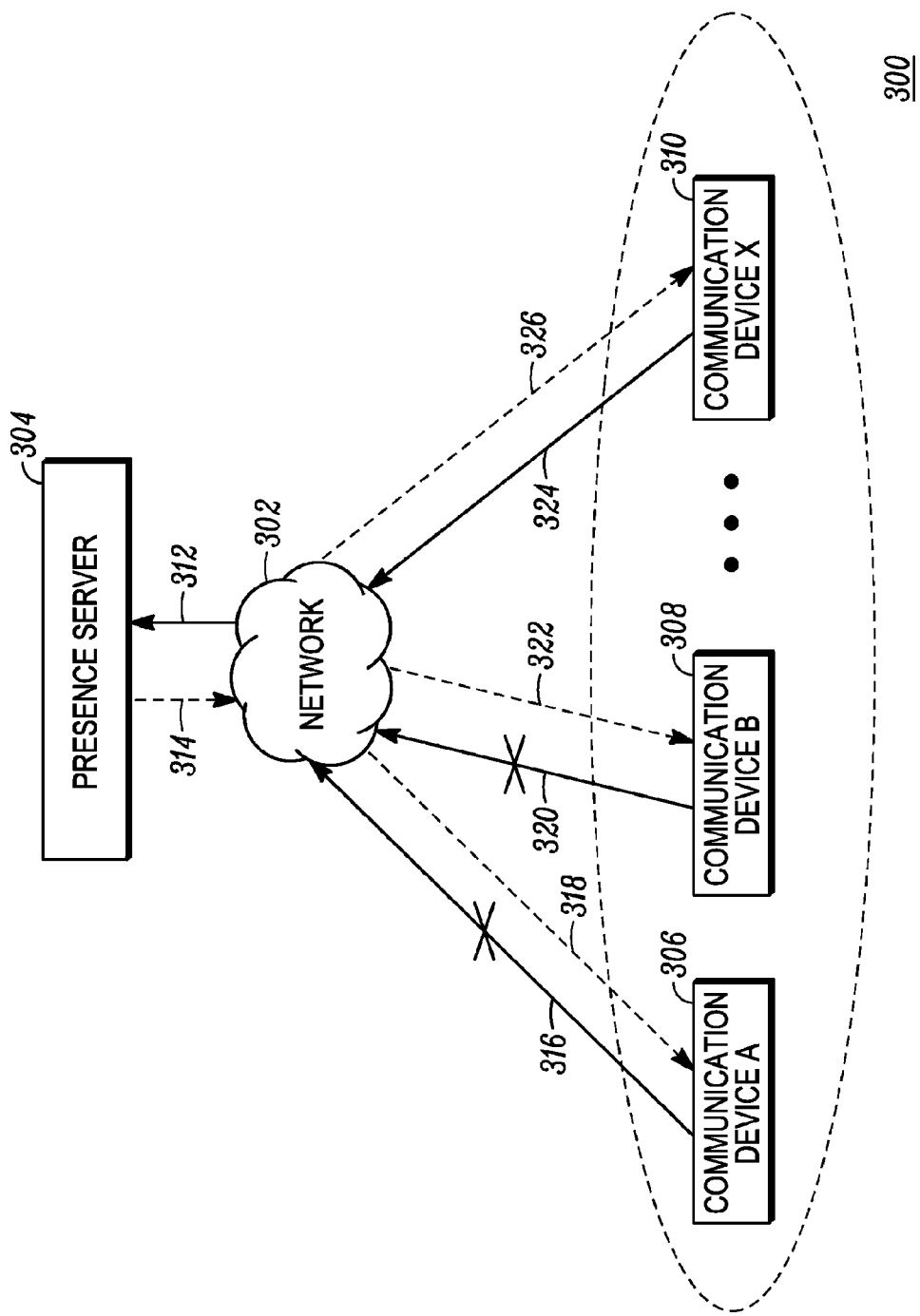
FIG. 3 is a block diagram illustrating a system wherein methods are implemented for updating presence information of a plurality of presentities in accordance with an embodiment.

FIG. 3 illustrates a system 300 that includes a communication device A (306), a communication device B (308), up to a communication device X (310) that communicate with a presence server 304 via a network 302. Uplink communications from the communication devices A, B, and X to the presence server 304 occur over communication links 316, 320, 324, and 312. Downlink communications from the presence server 304 to the communication devices A, B, and X occur over communication links 314, 318, 322, and 326.

Figure 4:
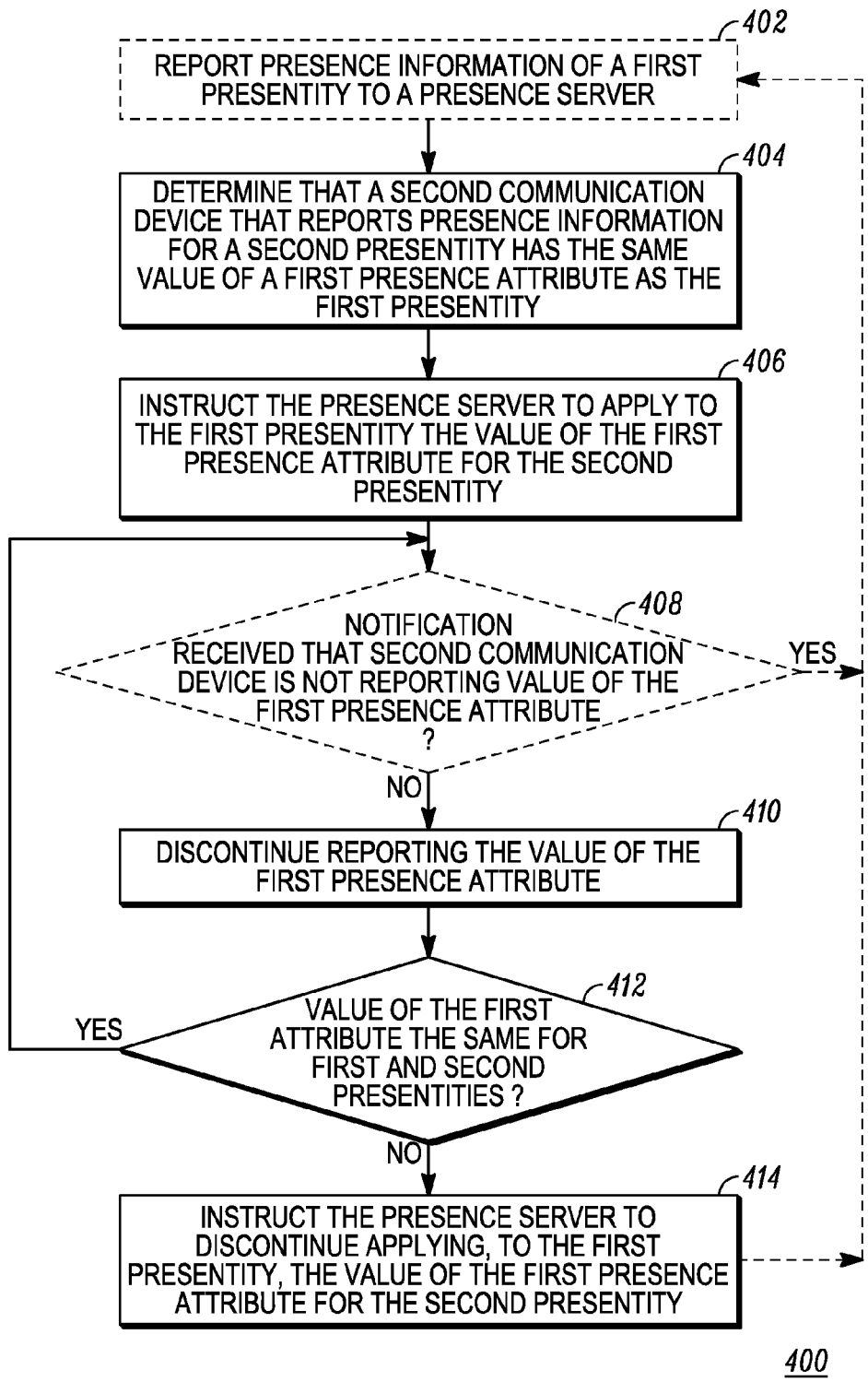
FIG. 4 is a flow diagram of a method, performed by a communication device, for enabling the updating of presence information for a plurality of presentities in accordance with the embodiment illustrated by reference to FIG. 3.

In accordance with this other embodiment, any one of the communication devices in system 300 implements a method 400 illustrated by reference to FIG. 4. For instance, processing device 120 is programmed with logic for performing at least some of the functional steps of method 400 as hereinafter described; thereby being implemented as a special purpose processor or special purpose computer programmed to perform method 400. In other words, this special purpose computer is the structure that serves as the means for performing the functionality of method 400. In the example implementation described below, both communication devices A and B perform method 400, with communication device X being the reporting device. However, for clarity of explanation, the description of the method 400 will be explained by reference to communication devices A and X.

Communication device A may or may not already be reporting (402) a value for a presence attribute for a presentity, e.g., a user of device A. Communication device A determines (404) that communication device X (which reports presence information for a different presentity) has the same value of a presence attribute as the first presentity. In other words, communication device A determines that its presentity and the presentity associated with device X share a common presence attribute having the same value. Communication device A then instructs (406) the presence server 304 to apply to its presentity the value of the common presence attribute reported by communication device X, and discontinues (410) its own reporting for the common presence attribute, as indicated in FIG. 3 by the "X" over the uplink channels 316 and 320, respectively between communication devices A and B and network 302.

In an embodiment, communication device A has authenticated to communication device X using any known authentication method and considers communication device X a trusted communication device or the user of the device X a trusted user; thereby providing the basis for its selection of communication device X. For example, communication device X may be a special device or controller installed on a train, bus, boat, etc., and provisioned by a shared service provider. In another example, the user of communication device X is within a trusted buddy group of devices, such as within a family or a group of associates.

There are a number of ways in which the communication device A may determine that its presentity and the presentity associated with communication device X (wherein the presentity may be the train or bus or the operator of the train or bus or a member of a buddy group) share the same value for a common presence attribute. For instance, the two device users may follow a similar itinerary or commute, e.g., on the train or bus, or in a meeting, and the detection could be made based on a proximity detection. The proximity detection can be based on a determination by the communication device A that: the communication device X is within a predefined or known distance from communication device A; communication device X is traveling along the same itinerary as the communication device A; and/or communication device X is traveling to the same destination as communication device A; etc. In another implementation, communication device X is selected after successful communications between two devices wherein certain information data may have been exchanged to enable communication device A to determine that the same value is shared for a common presence attribute.

In some cases, upon receiving the instruction from communication device A to apply to its presentity the value of the common presence attribute reported by communication device X, the communication server determines that communication device X is not reporting the value for that particular presence attribute (or group of presence attributes). Such a determination can be directly made based on communications between the presence server 304 and communication device X or inferentially made based on a failure to receive an update of a value before the lapse of a time-out timer. In this case, the presence server 304 sends and communication device X, thereby, receives (408) a notification that communication device X is not reporting the value of the common presence attribute; and communication device A can itself report (402) the presence information for its presentity.

The presence server 304 continues to apply the value of the common presence attribute to the presentities associated with both communication device A and X until communication device A instructs (414) the presence server to the contrary. Communication device A provides the instruction (414) upon determining (412) that its presentity and the presentity associated with communication device X no longer share the same value for the common presence attribute. For example, the user of device A may leave the train or meeting and the communication device A, thereby, detects that the proximity parameters are no longer met between devices A and X; and communication device A can itself report (402) the presence information for its presentity.

Figure 5:
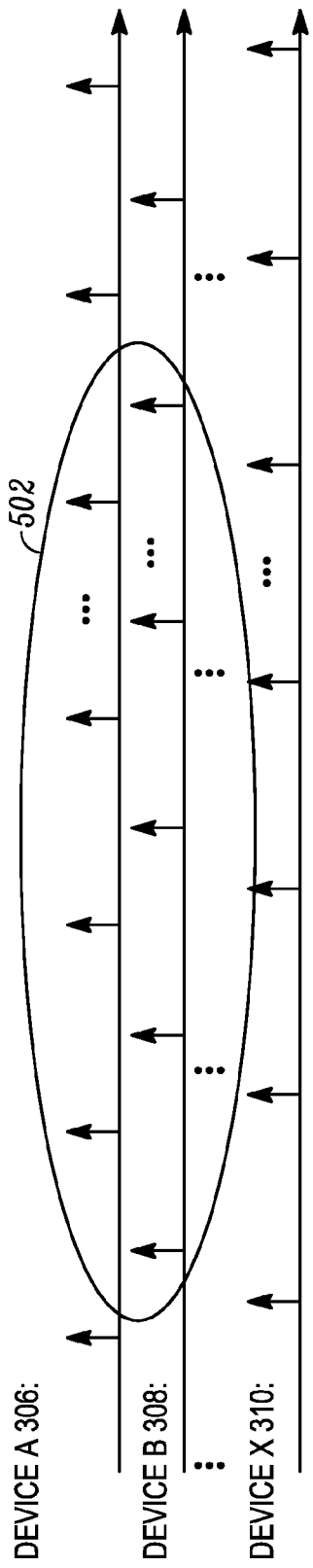
FIG. 5 is a diagram illustrating FIG. 3 communication devices individually reporting presence information using prior art methods.
Figure 6:
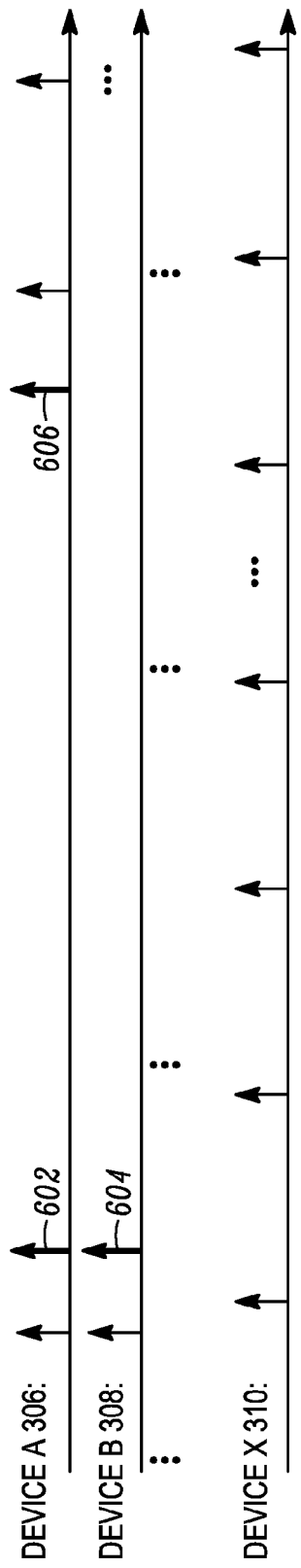
FIG. 6 is a diagram illustrating the FIG. 3 communications devices reporting presence information using the method shown in FIG. 4.

FIG. 5 illustrates all three communication devices A, B, and X in system 300 performing prior art reporting 502 of the same value for a common presence attribute (with the reported value being indicated by the arrowed lines pointing upwards). FIG. 6 shows reporting of the same value for the common presence attribute when communication devices A and B implement method 400 in accordance with the teachings herein. As can be seen, devices A and B discontinue 602, 604 reporting the value for a time and only device X reports because the presence server 304 is applying the value to all three devices. At some time, communication device A instructs the presence server 304 to discontinue applying the value to its presentity and resumes (606) reporting the value for that particular presence value. A savings in the number of updates can be readily seen in this example having only three devices. Such savings are multiplied in systems having hundreds and even thousands of communication devices.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processor" or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for biometric authentication described herein. The non-processor circuits may include, but are not limited to, a radio receiver, a radio transmitter, signal drivers, clock circuits, power source circuits, and user input devices. As such, these functions may be interpreted as steps of a method of updating presence information of presentities in a communication system as described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A method of updating presence information for a plurality of presentities, the method comprising:
at a presence server:
determining that all or some presentities report duplicative presence information, wherein presence information is defined as a dynamic set of information pertaining to a presentity that includes one or more presence attributes;
grouping presentities that report duplicative presence information to define a group of presentities that have the same value for a first presence attribute;
receiving, from a first presentity within the group of presentities, an updated value for their first presence attribute; and
applying the received value for the first presence attribute of the first presentity to all of the presentities in the group of presentities that report duplicative presence information such that a single update of the attribute from the first presentity within the group of presentities causes the same attribute to be updated to the same value for each presentities within the group of presentities to report duplicative presence information.

2. The method of claim 1, wherein defining the group comprises receiving identification information of the presentities in the group from a group management entity.

3. The method of claim 1, wherein defining the group comprises:
receiving, from a communication device that reports presence information for a first presentity, an instruction to apply to the first presentity a value of the first presence attribute for a second presentity; and
defining the group to include the first presentity and the second presentity.

4. The method of claim 1 further comprising:
determining a reporting schedule to set an aggregate reporting rate for the group; and
providing a reporting instruction to at least some of the presentities in the group to maintain the aggregate reporting rate.

5. The method of claim 4, wherein the presentities are associated with a plurality of communication devices, and the reporting schedule comprises a first subset of the communication devices reporting the update and a second subset of the presentities discontinuing reporting the update.

6. The method of claim 5, wherein at least one of the first or the second subsets changes over time.

7. The method of claim 5, wherein the first subset comprises a single one of the communication device in the plurality, and the second subset comprises all of the other communication devices in the plurality.

8. The method of claim 7, wherein the single one of the communication devices included in the first subset changes over time.

9. The method of claim 4, wherein the reporting schedule comprises each of the communication devices in the plurality reporting the update at a reduced reporting rate.

10. The method of claim 1, wherein the presentities in the group share the same value for the first presence attribute due to at least one of:
membership in the same communication group;
assignment to the same incident;

assignment of the same functional role; or possession of a defined set of skills.

11. A system for updating presence information for a plurality of presentities, the system comprising:

a group management entity that determines that all or some presentities report duplicative presence information, wherein presence information is defined as a dynamic set of information pertaining to a presentity that includes one or more presence attributes, the group management entity groups presentities that report duplicative presence information to produce a group of presentities that have a same value for a first presence attribute, wherein each of the presentities in the group are members of a same communication group and wherein the first presence attribute is taken from the group consisting of location, network availability, mood, moving direction, speed, destination, estimated time to reach a destination, distance from a destination, and a presence server that: receives from the group management entity an identifier for each presentity in the communication group; receives an updated value of the first presence attribute from one of the presentities in the communication group; and applies the received updated value of the first presence attribute to all of the presentities in the communication group, such that a single update of the attribute from the presentity within the group of presentities causes the same attribute to be updated to the same value for all presentities within the group of presentities.

* * * * *